Sept. 27, 1932. H. T. HALLOWELL ET AL 1,879,214
TRUCK
Filed Oct. 28, 1930
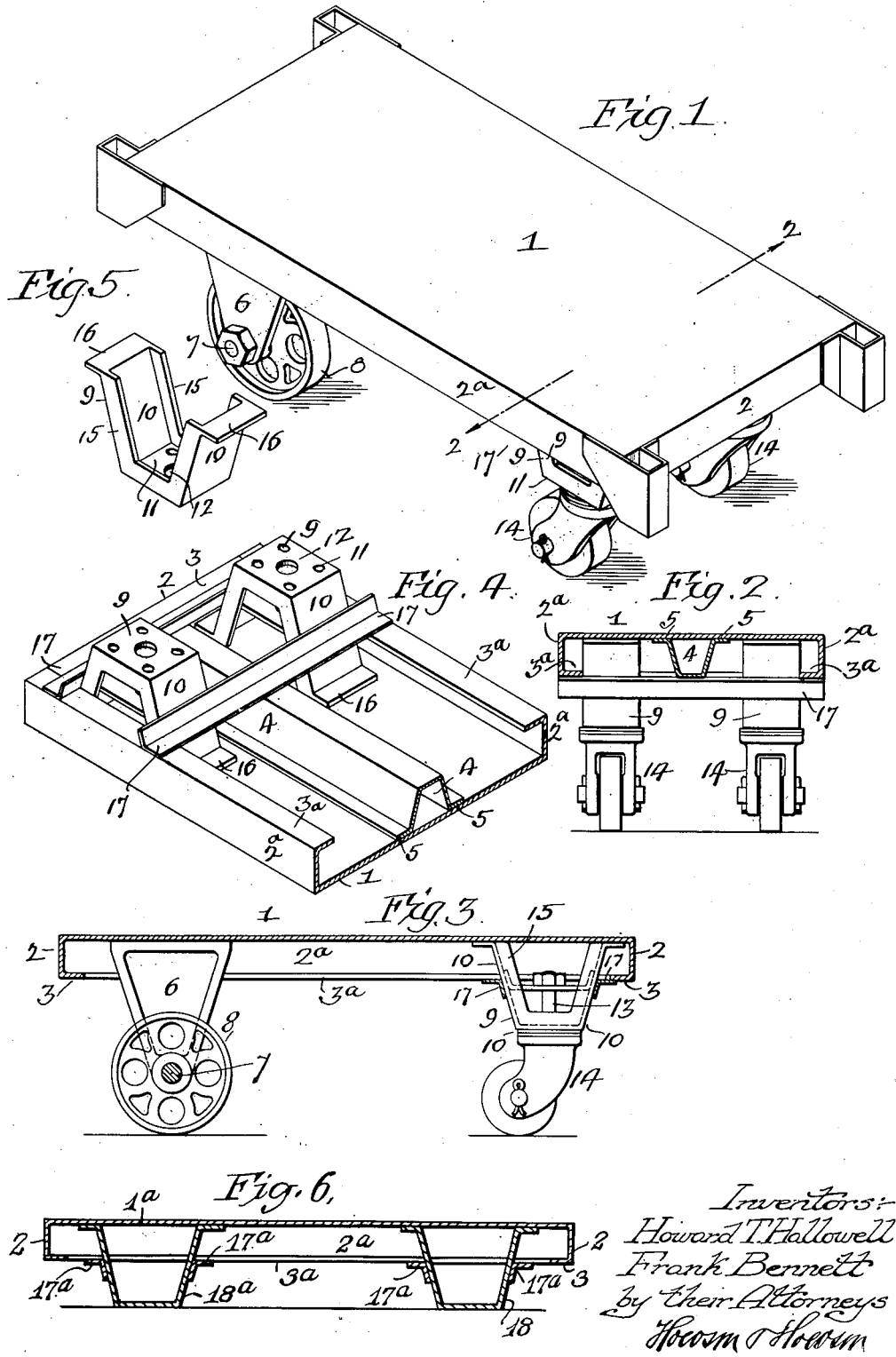

Patented Sept. 27, 1932

1,879,214

UNITED STATES PATENT OFFICE

HOWARD T. HALLOWELL AND FRANK BENNETT, OF JENKINTOWN, PENNSYLVANIA, ASSIGNORS TO STANDARD PRESSED STEEL CO., OF JENKINTOWN, PENNSYLVANIA, A CORPORATION OF PENNSYLVANIA

TRUCK

Application filed October 28, 1930. Serial No. 491,789.

One object of our invention is to make a substantial platform for trucks, etc., which will withstand the rough usage to which such truck is subjected.

A further object of the invention is to so arrange the transverse reinforcing members that they not only reinforce the body of the platform but also reinforce the brackets which support the platform.

In the accompanying drawing:

Fig. 1 is a perspective view of a platform truck embodying our invention;

Fig. 2 is a transverse sectional view on the line 2—2, Fig. 1;

Fig. 3 is a longitudinal sectional view of the truck shown in Fig. 1;

Fig. 4 is an inverted sectional perspective view illustrating the details of the invention;

Fig. 5 is a detached perspective view of one of the brackets in which the casters are mounted; and Fig. 6 is a sectional view of a platform having short supporting legs to which our invention is applied.

Fig. 1 illustrates a trunk having a platform 1 made of metal provided with flanges 2 at each end and flanges 2a at each side. These flanges are turned in at 3—3a, making a channel edge which gives strength to the entire platform. Extending longitudinally of the platform is a channel beam 4 having flanges 5 at each side which are welded to the underside of the platform as clearly shown in Figs. 2 and 4. Welded or otherwise secured to the platform are bearings 6 for the axle 7 on which are mounted the large wheels 8, one wheel being located at one side of the truck and the other wheel being located on the other side thereof. At the opposite end of the truck from the bearings 6 are supporting brackets 9 pressed-up from sheet metal as shown in Fig. 5, having side members 10, and a base member 11 which is perforated at 12 for the shank 13 of the caster 14 or for bolts as desired, and each side member 10 and the base member 11 are reinforced by an inturned flange 15 which extends from one portion 16 of the bracket to the other portion 16. When the brackets are placed in position, the portions 16 are welded or otherwise secured to the underside of the platform 1 as shown in Fig. 4.

In order to reinforce the platform, particularly at the end thereof, which is supported by the casters and which receives the heavy blows due to dropping of articles on this end of the platform, angle bars are provided as at 17 which extend from one side of the truck to the other and are secured to the inturned flanges 3a of the sides of the platform and to the central longitudinal channel beam 4, and as the depending member of the angle is on the same incline as the sides 10 of the supports or brackets 9, they rest against the side members and are welded thereto so that not only is the platform strengthened but the brackets are materially reinforced by the transverse angle members which act as lower truss members so as to resist any thrusts on the brackets due to the truck meeting an obstruction.

The angle bars 17 extend from one deep side flange 2a to the other side flange and are firmly secured to the brackets 9, so that when heavy loads are placed upon the platform 1 the weight is not only carried by the portions of the brackets which are secured to the underside of the platform, but also by the deep inturned flanges 2a, through the angle bars 17. This construction prevents the brackets from distorting the top plate of the platform 1 when excessive loads are placed on the truck outside of the area not directly supported by the brackets. The distortion or bulging of the top plate makes it uneven, which is highly objectionable.

In Fig. 6 we have shown the invention as applied to a platform 1a which is supported by feet 18, which are welded to the underside of the platform as at 19 and are reinforced by the transverse angle members 17a which extend from one side of the truck to the other and welded to the platform and to the feet.

We claim:—

1. The combination in a platform made of a plate forming the top of the platform, having deep inturned side flanges; supports spaced from each other and secured to the underside of the plate; and angle bars extending from one side flange to the other and secured to the supports some distance from the point of attachment of the supports to the underside of the plate forming the platform, so that the excessive loads will be taken by the side flanges through the angle bars.

2. The combination of a platform made of a metal top plate having deep side and end flanges; a centrally located longitudinal channel member secured to the underside of the top plate and extending to the end flanges; two supporting members, one on each side of the longitudinal channel member, the upper ends of the supporting members being flanged and welded to the underside of the top plate, the flanges and the longitudinal channel member being of the same depth; and transverse angle bars extending from one side flange to the other and welded to the flanges and to the longitudinal channel member and welded also to the supporting members, so that the excessive loads on the platform will be taken by the side flanges through the angle bars.

HOWARD T. HALLOWELL.
FRANK BENNETT.